United States Patent
Cheung et al.

(10) Patent No.: US 7,194,627 B2
(45) Date of Patent: Mar. 20, 2007

(54) METHOD AND SYSTEM FOR DATA ENCRYPTION AND DECRYPTION

(75) Inventors: Francis Cheung, Del Mar, CA (US); Jason Monroe, Ladera Ranch, CA (US); Jay Kwok Wa Li, Milpitas, CA (US); Kevin Patariu, San Diego, CA (US); Iue-Shuenn Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 710 days.

(21) Appl. No.: 10/414,844

(22) Filed: Apr. 15, 2003

(65) Prior Publication Data

US 2004/0250097 A1 Dec. 9, 2004

Related U.S. Application Data

(60) Provisional application No. 60/455,021, filed on Mar. 14, 2003.

(51) Int. Cl.
*G06F 1/24* (2006.01)

(52) U.S. Cl. ........................ 713/168; 713/182; 713/189; 713/193

(58) Field of Classification Search ................ 713/168, 713/182, 189, 193
See application file for complete search history.

(56) References Cited

U.S. PATENT DOCUMENTS

| 4,278,837 | A | * | 7/1981 | Best ........................... 713/190 |
| 4,633,388 | A | * | 12/1986 | Chiu ........................... 712/208 |
| 5,214,701 | A | * | 5/1993 | Quisquater et al. .......... 380/29 |
| 5,892,826 | A | * | 4/1999 | Brown et al. ............... 713/190 |

* cited by examiner

*Primary Examiner*—Thomas Peeso
(74) *Attorney, Agent, or Firm*—McAndrews, Held & Malloy, Ltd

(57) ABSTRACT

An aspect of the of the invention may include the transfer of a block of data from a first memory location to a second memory location in a DRAM. During the transfer of the block of data from the first memory location, if an encryption mode is selected, the data may be buffered, encrypted, and then stored in the second memory location. If a decryption mode is selected, the transferred data may be buffered, decrypted and then stored in the second memory location. If a bypass mode is selected, the data may be buffered and then stored in the second memory location. In this regard, the encryption/decryption operations may be bypassed.

26 Claims, 3 Drawing Sheets

METHOD AND SYSTEM FOR DATA ENCRYPTION AND DECRYPTION

CROSS-REFERENCE TO RELATED APPLICATIONS/INCORPORATION BY REFERENCE

This application makes reference to, claims priority to and claims the benefit of United States Provisional Patent Application Ser. No. 60/455,021 entitled "System and Method for Data Encryption and Decryption" filed on Mar. 14, 2003.

This application also makes reference to:

U.S. patent application Ser. No. 10/414,724 entitled "Method And System For Controlling An Encryption/Decryption Engine Using Descriptors" filed on Apr. 16, 2003;

U.S. patent application Ser. No. 10/414,577 entitled "Method And System For Data Encryption/Decryption Key Generation And Distribution" filed on Apr. 16, 2003;

U.S. patent application Ser. No. 10/417,051 entitled "Method And System For Secure Access And Processing Of An Encryption/Decryption Key" filed on Apr. 16, 2003; and U.S. patent application Ser. No. 10/414,575 entitled "Method And System For Data Encryption And Decryption" filed on Apr. 16, 2003.

The above stated applications are incorporated herein by reference in their entirety.

FIELD OF THE INVENTION

Certain embodiments of the invention relate to data security. More specifically, certain embodiments of the invention relate to a method and system for memory to memory data encryption and decryption.

BACKGROUND OF THE INVENTION

In some conventional encryption applications, it is necessary to send data to a hard disk to be encrypted and retrieve data from the hard disk for decryption. One such application is personal video recording (PVR). In such systems, the encryption/decryption functions are implemented by separate devices between the ATA host adapter and the ATA bus connector. ATA stands for AT Attachment, a standardized interface used by storage devices such as hard disk drives, CD drives and DVD drives. ATA compatible drives may also be referred to as integrated drive electronics (IDE) drives. One drawback with conventional separate device implementations is that unencrypted or "clear" data is available at the interface between the ATA host adapter and the external encryption/decryption chip, and can be intercepted and stored in unencrypted form. Additionally, the encryption used in conventional systems is not particularly "strong" and could be broken relatively easily.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for data encryption and decryption. An aspect of the method for data encryption and decryption may include the transfer of a block of data from a first memory location to a second memory location in a random access memory such as a DRAM. During the transfer of the block of data from the first memory location, if an encryption mode is selected, the data may be buffered, encrypted, and then stored in the second memory location. In another aspect of the invention, if during the transfer of the block of data from the first memory location, a decryption mode is selected, the data may be buffered, decrypted and then stored in the second memory location. In another aspect of the invention, if during the transfer of the block of data from the first memory location, a bypass mode is selected, the data may be buffered and then stored in the second memory location. In this regard, the encryption and decryption operations are bypassed.

A method for encrypting and decrypting data on a chip may include receiving data from a memory device coupled to a first memory interface and determining whether an encryption, decryption or bypass operation should be performed on the received data. An encryption or decryption operation may be executed on the received data within the chip. Any resulting encrypted or decrypted data from the encryption or decryption operation, or from the bypass operation may be transferred back to the memory device.

At least one encryption key may be identified for use during encryption of the received data. Similarly, at least one decryption key may be identified for use during decryption of the received data. An encryption/decryption processor may be instructed to perform an encryption operation using one or more encryption keys if an encryption operation is selected to be performed. An encryption/decryption processor may be instructed to perform a decryption operation using one or more encryption keys if a decryption operation is selected to be performed. In a case where a bypass operation is to be performed, then the encryption/decryption processor may be adapted to bypass the encryption and decryption operation. The data received from the memory device may be buffered in at least one buffer integrated within the chip prior to the execution of the encryption and decryption operations. Similarly, the resulting data from the encryption and decryption operations, and from the bypass operation may be buffered prior to being transferred back to the memory device. Data received from the memory device may be received from a first location of the memory device and transferring back to a second memory location of the memory device. The memory device may be external to the chip.

Another embodiment of the invention provides, a machine-readable storage, having stored thereon a computer program having at least one code section for providing memory to memory data encryption and decryption, the at least one code section executable by a machine for causing the machine to perform the steps as described above.

Another aspect of the invention provides a system for encrypting and decrypting data on a chip. The system may include at least one buffer adapted to receive data from a memory device coupled to a first memory interface. At least one key and encryption/decryption selector and controller may be adapted to determine which one of an encryption, decryption and bypass operations is to be performed on the received data. The at least one encryption/decryption processor may be adapted to execute either one of the encryption and decryption operations on the received data within the chip. Any resulting data from the encryption and decryption operations, and data from the bypass operation may be transferred back to the memory device.

The key and encryption/decryption selector and controller may be further adapted to identify one or more encryption keys to be utilized during execution of the encryption operation. Similarly, the key and encryption/decryption selector and controller may be further adapted to identify one or more decryption keys to be utilized during execution of the decryption operation. The key and encryption/decryption selector and controller may be also further adapted to instruct an encryption/decryption processor to perform execution of the encryption operation using one or more of the encryption keys if said determined operation is an encryption operation. Additionally, if a decryption operation is to be performed, the key and encryption/decryption selector and controller may be further adapted instruct the encryption/decryption processor to execute the decryption operation using one or more of the decryption keys. At least one selector may be adapted to select a bypass of the encryption and decryption operations of the encryption/decryption processor, whenever it is determined that a bypass operation should be performed. The at least one buffer, which may be located within the chip, may be adapted to buffer the received data prior to execution of the encryption and decryption operations. The buffer may be adapted to buffer the resulting data from the encryption and decryption operations, and to buffer the data from the bypass operation prior to being transferred back to the memory device.

In accordance with an aspect of the invention, the system may include a memory interface adapted to receive data from a first location of the memory device and to transfer the resulting encrypted and decrypted data, and the bypass data to a second memory location of the memory device. The memory interface may be integrated within the chip and the memory device located externally to the chip. A CPU interface may be adapted to provide control of the chip via an external processor.

These and other advantages, aspects and novel features of the present invention, as well as details of a illustrated embodiment thereof, will be more fully understood from the following description and drawings.

DETAILED DESCRIPTION OF THE INVENTION

Certain embodiments of the invention provide a method and system for data encryption and decryption. An aspect of the method for data encryption and decryption may include the transfer of a block of data from a first memory location to a second memory location in a random access memory such as a DRAM. During the transfer of the block of data from the first memory location, if an encryption mode is selected, the data may be buffered, encrypted, and then stored in the second memory location. In another aspect of the invention, if during the transfer of the block of data from the first memory location, a decryption mode is selected, the data may be buffered, decrypted and then stored in the second memory location. In another aspect of the invention, if during the transfer of the block of data from the first memory location, a bypass mode is selected, the data may be buffered and then stored in the second memory location. In this regard, the encryption and decryption operations may be bypassed.

Figure 1:
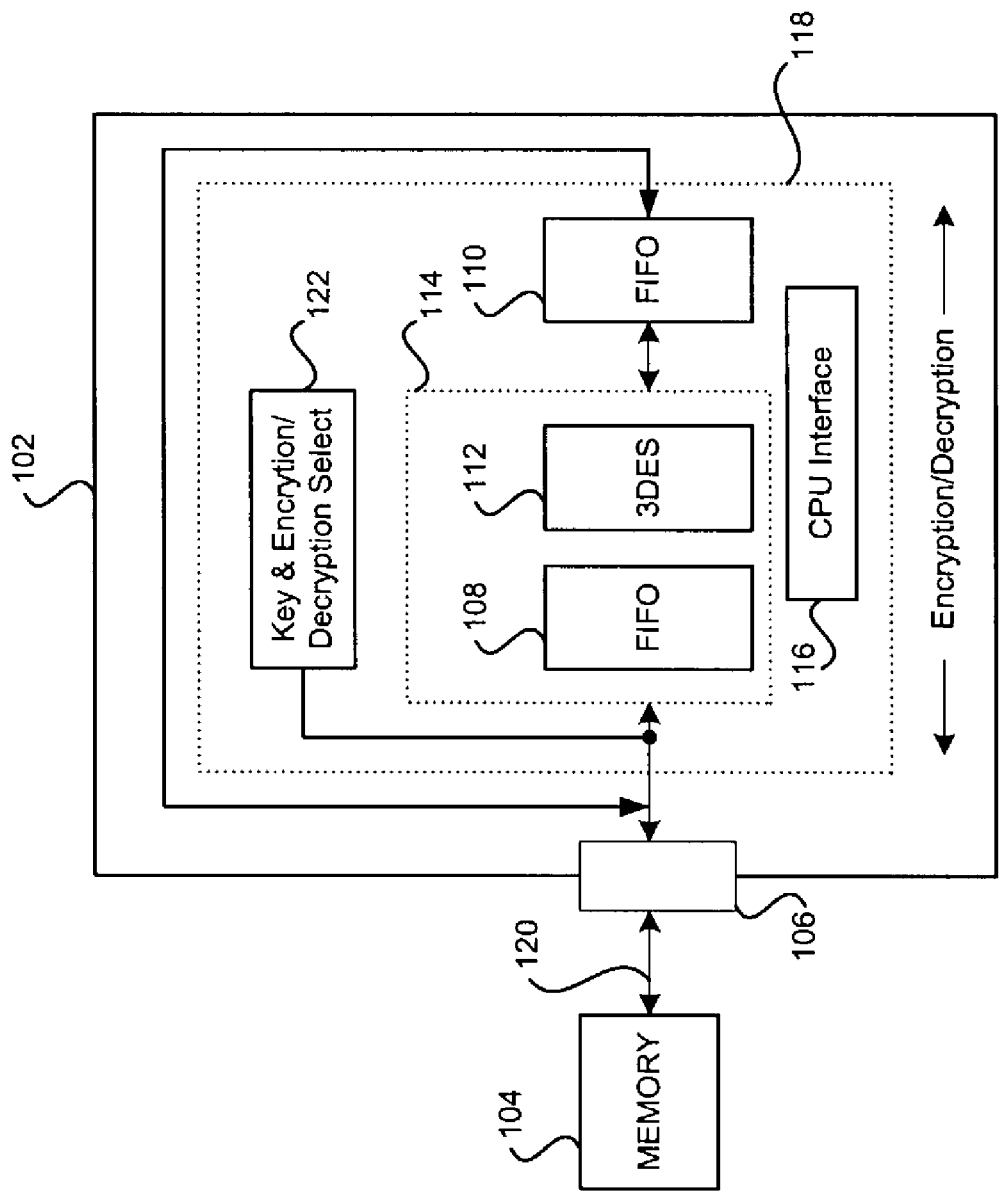
FIG. 1 is a block diagram of an exemplary system for memory to memory encryption/decryption in accordance with an embodiment of the invention.

FIG. 1 is a block diagram of an exemplary system for memory to memory (MEM—MEM) encryption/decryption in accordance with an embodiment of the invention. Referring to FIG. 1, there is shown a chip 102 having integrated therein, an memory DMA block (MEM-DMA) block 118 and a memory interface block 106. The memory DMA block 118 may include FIFO block 110, 3DES block 112, CPU interface 116 and key and encryption/decryption select and control block 122. The encryption/decryption block processor 114 may include FIFO block 108 and 3DES block 112.

The memory interface block 106 may be integrated within chip 102 and may be adapted to provide connectivity between the memory DMA block 118 and memory block 104. The memory interface block 106 may be, for example, a memory controller. Accordingly, suitable logic and/or a bus 120 may provide connectivity between the memory interface block 106 and the memory 104. The memory 104 may be a random access memory (RAM) such as a dynamic RAM (DRAM). In a case where memory 104 is a DRAM, then memory interface block 106 may be a DRAM controller. However, the invention is not limited in this regard, and other types of memories and corresponding memory controllers may be utilized.

The key and encryption/decryption select and control block 122 may include suitable control logic and/or circuitry that may be adapted to select a function to be performed by the encryption/decryption processor block 114. In this regard, the encryption/decryption processor block 114 may be adapted to select or deselect one of an encryption operation, a decryption operation and a bypass function. The control logic and/or circuitry in the key and encryption/decryption select and control block 122 may further be adapted to facilitate selection and control of encryption and decryption keys to be utilized by the 3DES block 112. In this regard, the encryption/decryption select and control block 122 may control which of a plurality of keys may be utilized by the 3DES block 112. The key and encryption/decryption select and control block 122 may further include suitable control logic and/or circuitry that may be adapted to provide various select signals that may be used to route data throughout chip 102 when any of the encryption, decryption, or bypass functions or operations may be required.

The CPU interface block 116 may include suitable logic and/or circuitry that may be adapted to provide control of the operation of chip 102 by an external processor. The external processor may be a host processor.

In operation, data to be encrypted by the encryption/decryption processor block 114 may be transferred to the FIFO block 108 in the encryption/decryption processor block 114, where it may be buffered. The data may be transferred from a first memory location in memory block 104. Notwithstanding, the memory interface block 106 may be adapted to control the transfer of the unencrypted data from the memory block 104 to the FIFO block 108 for decryption.

The key and encryption/decryption select and control block 122 may select an encryption operation to be performed by the encryption/decryption processor control block 114. The key and encryption/decryption select and control block 122 may also be adapted to select and supply appropriate encryption keys to be utilized by the encryption/ decryption processor control block 114 during the encryption operation. The 3DES block may utilize the supplied encryption keys to encrypt the data. The encrypted data may be buffered in FIFO 110. The memory interface block 106 may be adapted to control the transfer of the encrypted buffered data from FIFO 110 to the memory block 104. In this regard, the encrypted data may be stored in a second memory location that differs from the location in memory block 104 where the unencrypted data was originally stored.

In operation, encrypted data requiring decryption by the encryption/decryption processor block 114 may be transferred to the FIFO block 108 in the encryption/decryption processor block 114, where it may be buffered. The data may be transferred from a first memory location in memory block 104. Notwithstanding, the memory interface block 106 may be adapted to control the transfer of the encrypted data from the memory block 104 to the FIFO block 108 for decryption.

The key and encryption/decryption select and control block 122 may be adapted to select a decryption operation to be performed by the encryption/decryption processor control block 114. The key and encryption/decryption select and control block 122 may also be adapted to select and supply appropriate decryption keys to be utilized by the encryption/decryption processor control block 114 during the encryption operation. The 3DES block 112 may utilize the supplied decryption keys to encrypt the data. The decrypted data may be buffered in FIFO 110. The memory interface block 106 may be adapted to control the transfer of the decrypted buffered data from FIFO 110 to the memory block 104. In this regard, the decrypted data may be stored in a second memory location, which may differ from the location in memory block 104 where the encrypted data was originally stored.

Figure 2:
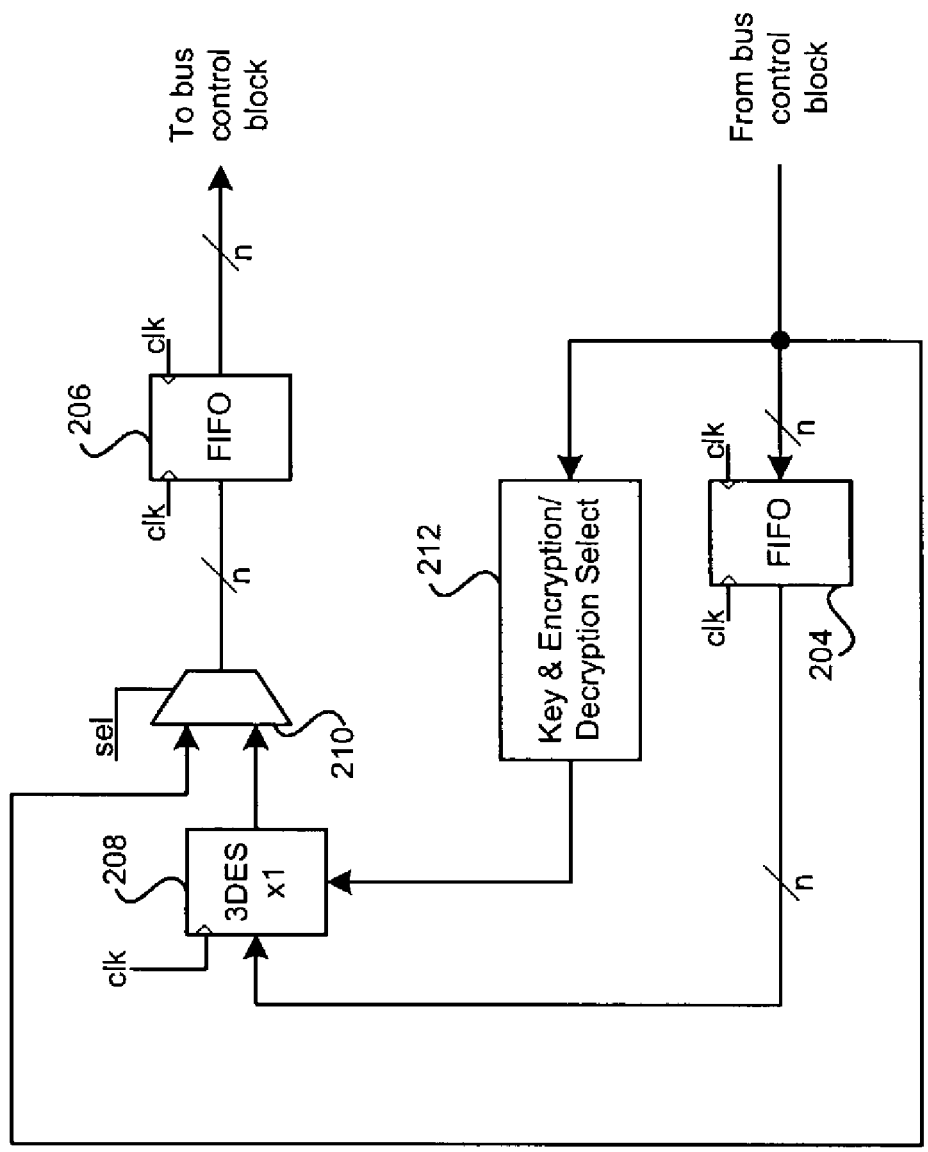
FIG. 2 is a block diagram illustrating the encryption/decryption of data using exemplary memory to memory system of FIG. 1 in accordance with an embodiment of the invention.

FIG. 2 is a block diagram illustrating the encryption/ decryption of data using the exemplary memory to memory system of FIG. 1 in accordance with an embodiment of the invention. Referring to FIG. 2, there are shown FIFO buffers 204, 206, selector 210, key and encryption/decryption select and control block 212, and 3DES block 208.

The selector 210 may be a multiplexer having a select line adapted to select between a first input and a second input of the selector 210. By selecting between a first input and a second input of selector 210, an encryption/decryption or a bypass mode of operation may be selected. In the encryption/decryption mode of operation, an output of the 3DES block 208 may be coupled to a second input of the selector 210, thereby buffering an encrypted or decrypted output of the 3DES block 208 in FIFO 206. In the bypass mode of operation, incoming data from a bus control block, for example, the memory interface block 106 of FIG. 1, may be communicated through a first input of selector 210 into FIFO buffer 206. The bus control block may then control the writing of data from the FIFO buffer into, for example, a memory such as memory block 104 of FIG. 1.

FIFOs 204, 206 may be adapted to buffer incoming data and outgoing data respectively. In this regard, FIFOs 204, 206 may include a first input clock and a second input clock signals. The buffers 204, 206 may be adapted to handle n-bits wide data, where n may be equivalent to 128, for example. The 3DES block may also include an input clock signal. The selector 210, FIFO buffers 204, 206 and 3DES block 208 may be adapted to handle n-bit wide data. In one aspect of the invention, n may be 128 or other suitable value.

In operation, data received from a bus control block for encryption may be buffered in FIFO buffer 204. During the encryption operation, suitable logic may be adapted to deselect or disable a first input of selector 210 and select or enable a second input of selector 210. In this regard, the key and encryption/decryption select and control block 212 may include suitable logic and/or circuitry that may be adapted to control the select pin of selector 210. In this regard, the key and encryption/decryption select and control block 212 may be adapted to select appropriate inputs of the selector 210, depending on the mode of operation. The key and encryption/decryption select and control block 212 may also be adapted to select and supply keys to be utilized by the 3DES block 114 during the encryption operation. Using the appropriate encryption keys, the 3DES block may encrypt the data. The encrypted data may subsequently be communicated through selector 210 via its second input and buffered in FIFO 206.

In operation, data received from a bus control block for decryption may be buffered in FIFO buffer 204. During the decryption operation, the key and encryption/decryption control block 212 may be adapted to deselect or disable a first input of selector 210 and select or enable a second input of selector 210. In this regard, the key and encryption/ decryption select and control block 212 may control the select pin of selector 210 to disable the first input of selector 210 and enable the second input of selector 210. The key and encryption/decryption select and control block 212 may also be adapted to select and supply appropriate decryption keys to be utilized by the 3DES block 114 during the decryption operation. Using the appropriate decryption keys, the 3DES block may decrypt the data. The decrypted data may subsequently be communicated through selector 210 via its second input and buffered in FIFO 206.

In operation, during the bypass mode of operation, the 3DES block 208 may be bypassed, and the data is neither encrypted nor decrypted, but remains in its same state. In this regard, the key and encryption/decryption select and control block 212 may control the select pin of selector 210 to enable the first input of selector 210 and disable the second input of selector 210. As a result, the data from the bus control register may bypass FIFO 204 and 3DES block 208, pass through the first input of selector 210 and be buffered in FIFO 206.

Figure 3:
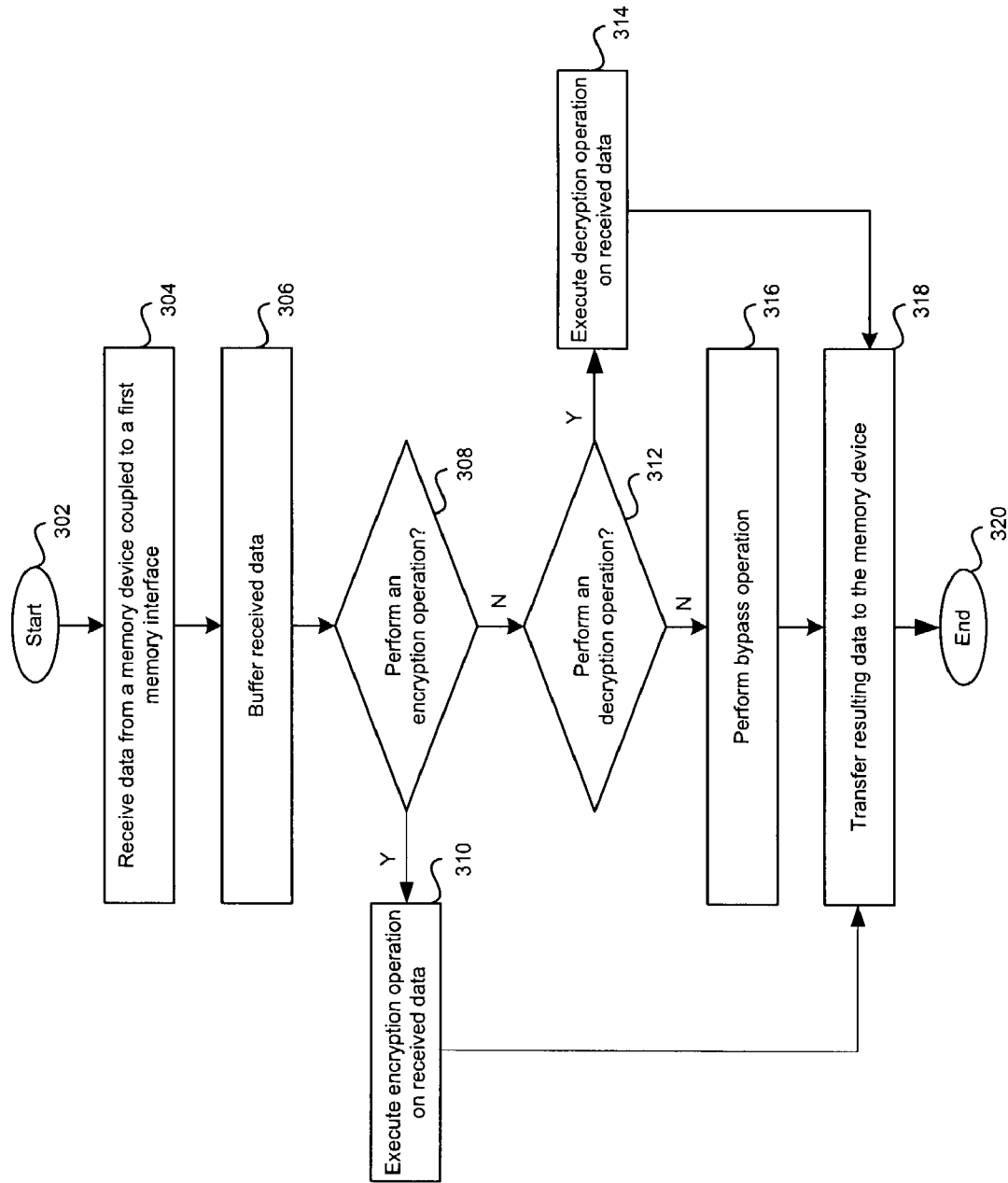
FIG. 3 is a flow chart illustrating exemplary steps for encrypting and decrypting data in accordance with an embodiment of the invention.

FIG. 3 is a flow chart illustrating exemplary steps for encrypting and decrypting data in accordance with an embodiment of the invention. Referring to FIG. 3, the exemplary steps may start with step 302. Subsequently, in step 304, data may be received from a memory device coupled to a first memory interface. In step 306, the received data may be buffered. In step 308, a determination may be made as whether an encryption operation should be performed on the received data. If an encryption operation should be performed, then in step 310, an encryption operation may be executed on the received data. If an encryption operation should not be performed, then in step 312, a determination may be made as to whether a decryption operation should be performed on the received data. If a decryption operation should be performed, then in step 314, a decryption operation may be executed on the received data. If a decryption operation should not be performed on the received data, then in step 316, a bypass operation may be performed. Subsequent to steps 314 and 316, step 318 may be performed. In step 318, resulting data from the bypass operation, encryption operation or decryption operation may be transferred to the memory device. The exemplary steps may end at step 320.

In another aspect of the invention, a 3DES encryption/ decryption simulation may be provided to illustrate exemplary encryption and decryption processes. During the simulation, an input data may acquired from an input file. For example, an input file, namely test1.encrypt.dat, may contain the following information:

0 0 01234567 89abcdef fedcba98 76543210
23456789 abcdef01
456789ab cdef0123

In this regard, the input file may specify a 3DES encryption using a key of, for example, 01234567 89abcdef fedcba98 76543210, on two 64-bit words of data. The two 64-bits words may be 23456789abcdef01 and fedcba9876543210.

Upon executing the 3DES operation using, for example the 3DES block 208 of FIG 2 with the test1.encrypt.dat input file, an output file may be generated. In this regard, an output file, namely test1.encrypt.dat.out, may be generated. The contents of the generated test1.encrypt.dat.out file may be as follows:

a47606af 132eeff7
792e2b91 7c75dce4

The encrypted data in test1.encrypt.dat.out may be decrypted using the following test1.decrypt.dat.in file. The contents of the test1.decrypt.dat.in file may be as follows.

1 0 01234567 89abcdef fedcba98 76543210
a47606af 132eeff7
792e2b91 7c75dce4

Upon decryption of the test1.decrypt.dat.in file, an output file, namely, test1.decrypt.dat may be generated. The contents of test1.decrypt.dat file may be as follows.

23456789 abcdef01
456789ab cdef0123

In this case, the decryption returns the original data.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for encrypting and decrypting data, the method comprising:
   receiving data from a memory device coupled to a first memory interface;
   determining which one of an encryption operation, a decryption operation and a bypass operation to be performed within a chip on said received data;
   if said determined encryption operation is to be performed,
      executing said encryption operation on said received data within said chip; and
      transferring resulting data from said executed encryption operation back to said memory device;
   if said determined decryption operation is to be performed,
      executing said decryption operation on said received data within said chip; and
      transferring resulting data from said executed decryption operation back to said memory device;
   if said determined bypass operation is to be performed,
      executing said bypass operation on said received data within said chip;
      transferring said received data back to said memory device; and
   buffering said received data in at least one buffer integrated within said chip prior to said execution of said encryption and decryption operations.

2. The method according to claim 1, comprising identifying at least one encryption key to be utilized for said execution of said encryption operation.

3. The method according to claim 2, comprising identifying at least one decryption key to be utilized for said execution of said decryption operation.

4. The method according to claim 3, comprising:
   instructing an encryption/decryption processor to perform said execution of said encryption operation using said at least one encryption key if said determined operation is an encryption operation; and
   instructing an encryption/decryption processor to perform said execution of said decryption operation using said at least one decryption key if said determined operation is a decryption operation.

5. The method according to claim 4, comprising bypassing said encryption and decryption operations of said encryption/decryption processor if said bypass operation is to be performed.

6. A machine-readable storage having stored thereon, a computer program having at least one code section for encrypting and decrypting data, the at least one code section executable by a machine for causing the machine to perform steps comprising:
   receiving data from a memory device coupled to a first memory interface;
   determining which one of an encryption operation, a decryption operation and a bypass operation to be performed within a chip on said received data;
   if said determined encryption operation is to be performed,
      executing said encryption operation on said received data within said chip; and
      transferring resulting data from said executed encryption operation back to said memory device;
   if said determined decryption operation is to be performed,
      executing said decryption operation on said received data within said chip; and transferring resulting data from said executed decryption operation back to said memory device;
if said determined bypass operation is to be performed,
executing said bypass operation on said received data within said chip; and
transferring said received data back to said memory device; and
buffering said received data in at least one buffer integrated within said chip prior to said execution of said encryption and decryption operations.

7. The machine-readable storage according to claim 6, comprising code for identifying at least one encryption key to be utilized for said execution of said encryption operation.

8. The machine-readable storage according to claim 7, comprising code for identifying at least one decryption key to be utilized for said execution of said decryption operation.

9. The machine-readable storage according to claim 8, comprising code for instructing an encryption/decryption processor to perform said execution of said encryption operation using said at least one encryption key if said determined operation is an encryption operation and for instructing an encryption/decryption processor to perform said execution of said decryption operation using said at least one decryption key if said determined operation is a decryption operation.

10. The machine-readable storage according to claim 9, comprising code for bypassing said encryption and decryption operations of said encryption/decryption processor if said bypass operation is to be performed.

11. A system for encrypting and decrypting data, the system comprising:
at least one buffer enables receiving of data from a memory device coupled to a first memory interface;
at least one key and encryption/decryption selector and controller enables determining of one of: an encryption, decryption and bypass operations, to be performed on said received data;
at least one encryption/decryption processor enables execution of one of: said encryption and decryption operations, on said received data within a chip: and
said at least one encryption/decryption processor enables transfer of one of: a resulting data from said encryption and decryption operations, and data from said bypass operation, back to said memory device; and
said at least one buffer enables buffering of said received data prior to said execution of said encryption and decryption operations.

12. The system according to claim 11, wherein said key and encryption/decryption selector and controller enables identification of at least one encryption key to be utilized for said execution of said encryption operation.

13. The system according to claim 12, wherein said key and encryption/decryption selector and controller enables identification of at least one decryption key to be utilized for said execution of said decryption operation.

14. The system according to claim 13, wherein said key and encryption/decryption selector and controller enables instructing of an encryption/decryption processor to perform said execution of said encryption operation using said at least one encryption key if said determined operation is an encryption operation and to instruct said encryption/decryption processor to perform said execution of said decryption operation using said at least one decryption key if said determined operation is a decryption operation.

15. The system according to claim 14, comprising at least one selector enables selection of a bypass of said encryption and decryption operations of said encryption/decryption processor if said bypass operation is to be performed.

16. The system according to claim 11, comprising a CPU interface enables control of said chip via an external processor through the CPU interface.

17. A method for encrypting and decrypting data, the method comprising:
receiving data from a memory device coupled to a first memory interface;
determining which one of: an encryption operation, a decryption operation, and a bypass operation, is to be performed within a chip on said received data;
if said determined encryption operation is to be performed,
executing said encryption operation on said received data within said chip; and
transferring resulting data from said executed encryption operation back to said memory device;
if said determined decryption operation is to be performed,
executing said decryption operation on said received data within said chip; and
transferring resulting data from said executed decryption operation back to said memory device;
if said determined bypass operation is to be performed,
executing said bypass operation on said received data within said chip; and
transferring said received data back to said memory device; and
buffering said received data in at least one buffer integrated within said chip prior to said execution of said encryption and decryption operations; and
buffering said resulting data from said encryption and decryption operations, and said data from said bypass operation in said at least one buffer prior to said transfer back to said memory device.

18. A method for encrypting and decrypting data, the method comprising:
receiving data from a memory device coupled to a first memory interface;
determining which one of an encryption operation, a decryption operation and a bypass operation to be performed within a chip on said received data;
if said determined encryption operation is to be performed,
executing said encryption operation on said received data within said chip; and
transferring resulting data from said executed encryption operation back to said memory device;
if said determined decryption operation is to be performed,
executing said decryption operation on said received data within said chip; and
transferring resulting data from said executed decryption operation back to said memory device;
if said determined bypass operation is to be performed,
executing said bypass operation on said received data within said chip; and
transferring said received data back to said memory device; and
said receiving comprises receiving said data from a first location of said memory device and said transferring comprises transferring said resulting data and said bypass data to a second memory location of said memory device.

19. A method for encrypting and decrypting data, the method comprising:

receiving data from a memory device coupled to a first memory interface;

determining which one of an encryption operation, a decryption operation and a bypass operation to be performed within a chip on said received data;

if said determined encryption operation is to be performed, executing said encryption operation on said received data within said chip; and transferring resulting data from said executed encryption operation back to said memory device;

if said determined decryption operation is to be performed, executing said decryption operation on said received data within said chip; and transferring resulting data from said executed decryption operation back to said memory device;

if said determined bypass operation is to be performed, executing said bypass operation on said received data within said chip; and transferring said received data back to said memory device, wherein said memory device is external to said chip.

20. A machine-readable storage having stored thereon, a computer program having at least one code section for encrypting and decrypting data, the at least one code section executable by a machine for causing the machine to perform steps comprising:

receiving data from a memory device coupled to a first memory interface;

determining which one of an encryption operation, a decryption operation and a bypass operation to be performed within a chip on said received data;

if said determined encryption operation is to be performed, executing said encryption operation on said received data within said chip; and transferring resulting data from said executed encryption operation back to said memory device;

if said determined decryption operation is to be performed, executing said decryption operation on said received data within said chip; and transferring resulting data from said executed decryption operation back to said memory device;

if said determined bypass operation is to be performed, executing said bypass operation on said received data within said chip; and transferring said received data back to said memory device;

buffering said received data in at least one buffer integrated within said chip prior to said execution of said encryption and decryption operations; and buffering said resulting data from said encryption and decryption operations, and said data from said bypass operation in said at least one buffer prior to said transfer back to said memory device.

21. A machine-readable storage having stored thereon, a computer program having at least one code section for encrypting and decrypting data, the at least one code section executable by a machine for causing the machine to perform steps comprising:

receiving data from a memory device coupled to a first memory interface;

determining which one of an encryption operation, a decryption operation and a bypass operation to be performed within a chip on said received data;

if said determined encryption operation is to be performed, executing said encryption operation on said received data within said chip; and transferring resulting data from said executed encryption operation back to said memory device;

if said determined decryption operation is to be performed, executing said decryption operation on said received data within said chip; and transferring resulting data from said executed decryption operation back to said memory device;

if said determined bypass operation is to be performed, executing said bypass operation on said received data within said chip; and transferring said received data back to said memory device; and receiving said data from a first location of said memory device and said transferring comprises transferring said resulting data and said bypass data to a second memory location of said memory device.

22. A machine-readable storage having stored thereon, a computer program having at least one code section for encrypting and decrypting data, the at least one code section executable by a machine for causing the machine to perform steps comprising;

receiving data from a memory device coupled to a first memory interface;

determining which one of an encryption operation, a decryption operation and a bypass operation to be performed within a chip on said received data;

if said determined encryption operation is to be performed, executing said encryption operation on said received data within said chip; and transferring resulting data from said executed encryption operation back to said memory device;

if said determined decryption operation is to be performed, executing said decryption operation on said received data within said chip; and transferring resulting data from said executed decryption operation back to said memory device;

if said determined bypass operation is to be performed, executing said bypass operation on said received data within said chip; and transferring said received data back to said memory device, wherein said memory device is external to said chip.

23. A system for encrypting and decrypting data, the system comprising:

at least one buffer that enables receiving of data from a memory device coupled to a first memory interface;

at least one key and encryption/decryption selector and controller that enables determining of one of: an encryption, decryption and bypass operations, to be performed on said received data;

at least one encryption decryption processor that enables execution of one of: said encryption and decryption operations, on said received data within a chip;

said at least one encryption/decryption processor enables transfer of one of: a resulting data from said encryption and decryption operations, and data from said bypass operation, back to said memory device, wherein said at least one buffer buffers said received data in said at least one buffer integrated within said chip prior to said execution of said encryption and decryption operations; and said at least one buffer buffers said resulting data from said encryption and decryption operations, and buffers said data from said bypass operation prior to said transfer back to said memory device.

24. A system for encrypting and decrypting data, the system comprising:

at least one buffer that enables receiving of data from a memory device coupled to a first memory interface;

at least one key and encryption/decryption selector and controller that enables determining of one of: an encryption, decryption and bypass operations, to be performed on said received data;

at least one encryption/decryption processor that enables execution of one of: said encryption and decryption operations, on said received data within a chip; and said at least one encryption/decryption processor enables transfer of one of: a resulting data from said encryption and decryption operations, and data from said bypass operation, back to said memory device, wherein said at least one buffer buffers said received data in said at least one buffer integrated within said chip prior to said execution of said encryption and decryption operations; and a memory interface that receives said received data from a first location of said memory device and transfers said resulting data and said bypass data to a second memory location of said memory device.

25. The system according to claim 24 wherein said memory interface is integrated within said chip.

26. A system for encrypting and decrypting data, the system comprising:

at least one buffer that enables receiving of data from a memory device coupled to a first memory interface;

at least one key and encryption/decryption selector and controller that enables determining of one of: an encryption, decryption and bypass operations, to be performed on said received data;

at least one encryption/decryption processor that enables execution of one of: said encryption and decryption operations, on said received data within a chip; and said at least one encryption/decryption processor enables transfer of one of: a resulting data from said encryption and decryption operations, and data from said bypass operation back to said memory device, wherein said at least one buffer buffers said received data in said at least one buffer integrated within said chip prior to said execution of said encryption and decryption operations: wherein said memory device is external to said chip.

* * * * *